United States Patent
Kimura et al.

(10) Patent No.: US 9,017,864 B2
(45) Date of Patent: Apr. 28, 2015

(54) ELECTROLYTE AND SECONDARY BATTERY

(75) Inventors: Akiyoshi Kimura, Hachioji (JP); Emiko Mikoshiba, Hino (JP)

(73) Assignee: Konica Minolta Holdings, Inc. (JP)

( * ) Notice: Subject to any disclaimer, the term of this patent is extended or adjusted under 35 U.S.C. 154(b) by 1051 days.

(21) Appl. No.: 12/728,597

(22) Filed: Mar. 22, 2010

(65) Prior Publication Data

US 2010/0248025 A1  Sep. 30, 2010

(30) Foreign Application Priority Data

Mar. 25, 2009  (JP) ................................. 2009-073516

(51) Int. Cl.
| | | |
|---|---|---|
| *H01M 6/04* | (2006.01) | |
| *H01M 10/42* | (2006.01) | |
| *H01M 10/052* | (2010.01) | |
| *H01M 10/056* | (2010.01) | |
| *H01M 10/0565* | (2010.01) | |
| *H01M 10/0567* | (2010.01) | |
| *H01M 10/0568* | (2010.01) | |

(52) U.S. Cl.
CPC ........ *H01M 10/4235* (2013.01); *H01M 10/052* (2013.01); *H01M 10/056* (2013.01); *H01M 10/0565* (2013.01); *H01M 10/0567* (2013.01); *H01M 10/0568* (2013.01); *H01M 2300/0085* (2013.01); *Y02E 60/122* (2013.01)

(58) Field of Classification Search
CPC .......... H01M 10/0056; H01M 10/052; H01M 2300/0022; H01M 2300/0045; H01M 2300/0085; Y02E 60/122
USPC ......... 429/188, 304, 306, 309, 319, 321, 322, 429/300, 302, 303; 423/335
See application file for complete search history.

(56) References Cited

U.S. PATENT DOCUMENTS

| | | | | |
|---|---|---|---|---|
| 6,190,805 | B1 * | 2/2001 | Takeuchi et al. ............... | 429/307 |
| 2008/0286187 | A1 * | 11/2008 | Kim et al. ...................... | 423/335 |
| 2009/0075176 | A1 | 3/2009 | Singh et al. | |

FOREIGN PATENT DOCUMENTS

| | | | |
|---|---|---|---|
| JP | 9-185962 | A | 7/1997 |
| JP | 2007-280948 | A | 10/2007 |
| JP | 2007280948 | A * | 10/2007 |
| JP | 2008-130229 | A | 6/2008 |

OTHER PUBLICATIONS

United Kingdom Intellectual Property Office Search Report for Application No. GB1004690.2 dated Jun. 14, 2010.

* cited by examiner

*Primary Examiner* — Basia Ridley
*Assistant Examiner* — Heng Chan
(74) *Attorney, Agent, or Firm* — Cantor Colburn LLP

(57) ABSTRACT

Provided is a secondary battery exhibiting excellent durability. Also disclosed is an electrolyte possessing a porous particle, an ionic liquid and a supporting electrolyte salt, wherein the electrolyte has a dynamic elastic modulus of at least $10^5$ Pa.

9 Claims, No Drawings

ELECTROLYTE AND SECONDARY BATTERY

This application claims priority from Japanese Patent Application No. 2009-073516 filed on Mar. 25, 2009, which is incorporated hereinto by reference.

TECHNICAL FIELD

The present invention relates to an electrolyte and a battery employing the same, and further to the electrolyte exhibiting high strength and the secondary battery exhibiting excellent battery performance, together with flame retardancy.

BACKGROUND

Along with the recent spread of electric vehicles, solar batteries and so forth, a high capacity electrical storage device has been increasingly demanded. A nonaqueous secondary battery specifically typified for lithium-ion battery, which is an electrical storage device with high voltage and high capacity, has been continuously utilized, and expanded in application. On the other hand, an organic solvent used for an electrolytic solution has a problem such as volatile and inflammability of the solvent. Further, since a metal vessel had to be employed to seal a solution, it was difficult to have a degree of freedom for battery shape.

In order to solve such the problem, batteries fitted with a gel electrolyte as a thinned electrolyte of a high energy density have been put into practical use. They have features such as no leakage of liquid, freedom in shape, and large scale area which is also possible to be thinned, unlike cylindrical and prismatic batteries.

However, the gel electrolyte is produced via gelation of an organic solvent, and is dangerous since it has no leakage of liquid but inflammability. Further, cost performance is not effective since not only it exhibits low strength, but also a separator has to be provided between electrodes. Electrolytes exhibiting no leakage of liquid together with flame retardancy and serving also as separators have been demanded.

In this case, it is known that a flame retardant gel electrolyte is produced via gelation of ionic liquid as a flame retardant electrolyte employing inorganic particles (refer to Patent Documents 1 and 2, for example). However, in order to conduct gelation of a solution, particles each having high specific surface area are to be arranged to be used. For this reason, particles having each high specific surface area and a nonometer-sized particle diameter are employed for conventionally known spherical particles. However, since strength of gel correlates with a particle diameter, the strength drops in the case of a small particle diameter. Accordingly, since this electrolyte exhibits weak strength though it exhibits high flame retardancy, it can not be used as a separator.

(Patent Document 1) Japanese Patent O.P.I. Publication No. 2007-280948
(Patent Document 2) Japanese Patent O.P.I. Publication No 2008-130229

SUMMARY

It is an object of the present invention to provide a secondary battery exhibiting excellent durability.

DESCRIPTION OF THE PREFERRED EMBODIMENTS

The above object of the present invention is accomplished by the following structures.

(Structure 1) An electrolyte comprising a porous particle, an ionic liquid and a supporting electrolyte salt, wherein the electrolyte has a dynamic elastic modulus of at least $10^5$ Pa.

(Structure 2) The electrolyte of Structure 1, wherein the porous particle has a specific surface area of 500-1000 $m^2/g$.

(Structure 3) The electrolyte of Structure 2, wherein the porous particle has an average particle diameter of 5-50 μm.

(Structure 4) The electrolyte of Structure 1, wherein the dynamic elastic modulus is $10^8$ Pa or less.

(Structure 5) The electrolyte of Structure 1, wherein the supporting electrolyte salt contained in the electrolyte preferably has an content of 5-40% by weight.

(Structure 6) The electrolyte of Structure 1, wherein the supporting electrolyte salt comprises at least one selected from the group consisting of $LiCF_3SO_3$, $LiPF_6$, $LiClO_4$, $LiI$, $LiBF_4$, $LiCF_3CO_2$, $LiSCN$, $LiN(CF_3SO_2)_2$, $NaI$, $NaCF_3SO_3$, $NaClO_4$, $NaBF_4$, $NaAsF_6$, $KCF_3SO_3$, $KSCN$, $KPF_6$, $KClO_4$ and $KAsF_6$.

(Structure 7) The electrolyte of Structure 1, wherein the porous particle comprises a mesoporous inorganic particle.

(Structure 8) The electrolyte of Structure 7, wherein the mesoporous inorganic particle has a specific surface area of 300-1000 $m^2/g$.

(Structure 9) A secondary battery comprising the electrolyte of Structure 1 between a positive electrode and a negative electrode.

(Structure 10) The secondary battery of Structure 9, being a lithium secondary battery.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

Next, the present invention will be described in detail.

It is a feature that the electrolyte of the present invention is an electrolyte comprising a porous particle, an ionic liquid and a supporting electrolyte salt, wherein the electrolyte has a dynamic elastic modulus of at least $10^5$ Pa. Further, the secondary battery of the present invention comprises the electrolyte of the present invention. The inventors have found out that a secondary battery fitted with the electrolyte exhibits excellent durability when the electrolyte has a dynamic elastic modulus of at least $10^5$ Pa. In addition, the dynamic elastic modulus is $10^8$ Pa or less.

"Dynamic elastic modulus" can be obtained from an elastic modulus at a time when strain of a constant period is applied, and its definition is described in "Shinpan Koubunshi Jiten" edited by Koubunshi Jiten Editorial Committee in "The Society of Polymer Science, Japan".

Next, the present invention, constituent elements thereof, and embodiments in the present invention will be described in detail.

Constituent elements of an electrolyte of the present invention each are detailed below.

(Ionic Liquid)

The ionic liquid contained in the electrolyte of the present invention means an ionic material in the molten state at room temperature (25° C.), and is not limited as long as it is a salt having cation species and anion species. Not only the compound can be frequently used as an electrolyte without using a solvent, but also it can be frequently used singly as an electrolyte.

In the present invention, as the electrolyte, preferable is one in which an alkali metal salt is dissolved in an ionic liquid as a nonaqueous electrolyte containing no volatile component, or a material obtained by a combination of an ionic liquid and a polymeric material.

In addition, since the ionic liquid serves as an electrolyte under the conventional condition, preferable is an ionic liquid singly, or one in which a mixture state of the alkali metal salt is in a liquid state at a temperature of 0-200° C.

Examples of the counter cation of the ionic liquid include 1-ethyl-3-methyl-imidazolium (EMI), N,N-diethyl-N-methyl-N-(2-methoxyethyl) ammonium (DEME), N-methyl-N-propyl pyrrolidinium (P13), and N-methyl-N-propyl piperidinium (PP13), but a structure thereof is not specifically limited as long as the structure is one stable in the voltage range for battery operation.

As the counter anion of the ionic liquid or the counter anion of the alkali metal salt, bis(trifluoromethylsulfonyl) imide (TFSI), bis(pentafluoroethylsulfonyl) amide (BETI), tetrafluoroborate (BF4), and hexafluorophosphate (PF6) may be used singly or in combination, but a structure thereof is not specifically limited as long as the structure is one stable in the voltage range for battery operation.

The ionic liquid of the present invention is preferably liquid at room temperature (for example, 25° C.). These compounds each preferably have a melting point of 80° C. or less; more preferably have a melting point of 60° C. or less; and still more preferably have a melting point of 30° C. or less.

The electrolyte of the present invention contains one kind of the ionic liquid, but may contain at least two kinds of the ionic liquid.

(Supporting Electrolyte Salt)

As the supporting electrolyte salt of the present invention, any salt is usable, but salts of metal ions belonging to Ia group or IIa group (periodic table) are preferably used. Preferable examples of metal ions belonging to Ia group or IIa group (periodic table) include lithium ion, sodium ion and potassium ion. Examples of the anion of a salt of metal ion include halide ion ($I^-$, $Cl^-$ or $Br^-$), $SCN^-$, $BF_4^-$, $PF_6^-$, $ClO_4^-$, $SbF_6^-$, $(CF_3SO_2)_2N^-$, $(CF_3CF_2SO_2)_2N^-$, $Ph_4B^-$, $(C_2H_4O_2)_2B^-$, $(CF_3SO_2)_3C^-$, $CF_3COO^-$, $CF_3SO_3^-$, and $C_6F_5SO_3^-$, but $SCN^-$, $BF_4^-$, $PF_6^-$, $ClO_4^-$, $SbF_6^-$, $(CF_3SO_2)_2N^-$, $(CF_3CF_2SO_2)_2N^-$, $(CF_3SO_2)_3C^-$, and $CF_3SO_3^-$ are preferable as the anion.

Examples of typical supporting electrolyte salts include $LiCF_3SO_3$, $LiPF_6$, $LiClO_4$, $LiI$, $LiBF_4$, $LiCF_3CO_2$, $LiSCN$, $LiN(CF_3SO_2)_2$, $NaI$, $NaCF_3SO_3$, $NaClO_4$, $NaBF_4$, $NaAsF_6$, $KCF_3SO_3$, $KSCN$, $KPF_6$, $KClO_4$ and $KAsF_6$. Further, the above-described Li salts are preferable. These salts may be used singly or in combination with at least two kinds.

The supporting electrolyte salt contained in the electrolyte preferably has an content of 5-40% by weight, and more preferably has an content of 10-30% by weight.

(Porous Particle)

Particles of the present invention each are porous. "Porous particle" means a particle having a very large number of pores inside the particle.

The porous particle of the present invention preferably has a specific surface area of 500-1000 $m^2/g$, and preferably has an average particle diameter of 5-50 μm. When such the specific surface area and average particle diameter are designed to be used, a dynamic elastic modulus of at least $10^5$ Pa becomes possible.

Particles each having a large specific surface area, which are called mesoporous inorganic particles, are preferably usable. The mesoporous inorganic particle is a porous body inorganic particle possessing a plurality of fine pores having a fine pore diameter of 2-50 nm (hereinafter, abbreviated to mesopore) as the region in which the Kelvin's capillary condensation theory is applicable.

The fine pore diameter and fine pore distribution can be measured employing a mercury intrusion technique, a gaseous adsorption technique or the like. The fine pore diameter of the present invention is referred to as a median diameter of the fine pore distribution calculated by analyzing the hysteresis pattern of the adsorption-desorption isotherm obtained via the gaseous adsorption technique with a fine pore distribution measuring device.

The composition of the mesoporous inorganic particle is not particularly limited as long as the particle possesses mesopores, but a mesoporous inorganic particle in which metal oxide appears to be a moiety, and the mesopores are regularly placed is preferable. Preferably usable examples of the metal oxides include $SiO_2$, $Al_2O_3$, $Nb_2O_5$, $Ta_2O_5$, $TiO_2$, $ZrO_2$, $SnO_2$, $Sb_2O_3$, and these composite oxides. Of these, neutral or acidic metal inorganic oxide particles are effective in view of improvement of ion conductivity. This corresponds to iron oxide, zirconium oxide, clay, tin oxide, tungsten oxide, titanium oxide, aluminum phosphate, silicon oxide, zinc oxide, aluminum oxide or the like. The hydroxyl group on the surface of the inorganic oxide interacts with an ionic liquid or a salt of a secondary battery to form an ion path to transport ions at high speed.

As a method of manufacturing mesoporous inorganic particles, usable is a commonly known method such as hydrothermal synthesis to use a surfactant or an organic compound as a template, and a method disclosed in Japanese Patent O.P.I. Publication No. 2005-53737, for example, is cited. The mesoporous inorganic particle is possible to retain a solvent inside mesopores or on the surface of the porous body.

Mesoporous inorganic particles of the present invention each having a specific surface area of 300-1000 $m^2/g$ are preferable in view of safety and charge-discharge durability. The specific surface area of the mesoporous inorganic particle in the present invention is referred to as one calculated with a BET isothermal adsorption formula as a BET specific surface area, from the adsorption isotherm obtained by adsorbing nitrogen gas onto the particle powder, employing a specific surface area meter.

A content of mesoporous inorganic particles in the battery composition is preferably 5-40% by weight, based on the ionic liquid in view of safety and a voltage characteristic.

Further, mesoporous inorganic particles preferably have an average particle diameter of 1-50 μm in view of safety and a voltage characteristic, more preferably have an average particle diameter of 5-50 μm, and still more preferably have an average particle diameter of 5-20 μm.

The average particle diameter is a volume mean value of a diameter when converting each particle into a sphere having the same volume of the particle (sphere conversion particle diameter), and this value can be evaluated via electron micrographs. That is, after taking transmission electron micrographs of the battery composition or the particle powder, at least 200 particles in a given viewing field range are measured to determine a sphere conversion particle diameter of each particle, and a mean value thereof is determined to be the foregoing value.

Further, mesoporous inorganic particles of the present invention are preferably subjected to a surface-hydrophobization treatment. Examples of the hydrophobization treatment agent include hexamethyldisilazane, trimethylmethoxysilane, trimethylethoxysilane and trimethylsilylchloride.

As the surface treatment method, there are a dry method to fix with heat by directly spraying particle powder, and a wet method to conduct a surface treatment via addition of a surface treatment agent by dispersing particles in a solution, but preferable is a wet method by which particles are evenly dispersed. For example, a method disclosed in Japanese Patent O.P.I. Publication No. 2007-264581 is preferably usable since particles subjected to a wet process treatment are highly dispersed.

In addition, in the present invention, nonporous particles may be used in combination with porous particles. Nonporous particles each preferably have a particle diameter of 100 nm or less, and more preferably have a particle diameter of 20 nm or less.

The content of porous particles in the present invention is not specifically limited, but porous particles preferably have a content of 5-100 parts by weight with respect to 100 parts by weight of an ionic liquid, and more preferably have a content of 10-70 parts by weight with respect to 100 parts by weight of an ionic liquid,
(Solvent)

In the present invention, a solvent together with the above-described electrolyte constituent elements can be used up to 50% by weight. However, no solvent is preferably used in view of storage stability.

A solvent used for a electrolyte of the present invention is desired to be a compound capable of producing excellent ion conductivity by improving ionic mobility because of low viscosity, or improving effective carrier concentration because of high dielectric constant.

Examples of such the solvent include carbonate compounds such as ethylene carbonate, propylene carbonate and so forth; heterocyclic compounds such as 3-methyl-2-oxazolidinone and so forth; ether compounds such as dioxane, diethylether and so forth; straight-chained ethers such as ethyleneglycoldialkyl ether, propyleneglycoldialkyl ether, polyethyleneglycoldialkyl ether, polypropyleneglycoldialkyl ether and so forth; nitrile compounds such as acetonitrile, glutarodinitrile, methoxyacetonitrile, propionitrile, benzonitrile and so forth; esters such as carboxylic acid ester, phosphoric acid ester, phosphonic acid ester and so forth; and aprotic polar substances such as dimethylsulfoxide, sulfolane and so forth.

Of these, preferable are carbonate compounds such as ethylene carbonate, propylene carbonate and so forth; heterocyclic compounds such as 3-methyl-2-oxazolidinone and so forth; nitrile compounds such as acetonitrile, glutarodinitrile, methoxyacetonitrile, propionitrile, benzonitrile and so forth; esters such as carboxylic acid ester, phosphoric acid ester, and phosphonic acid ester and so forth. These are used singly or in combination with at least two kinds.

As the solvent, one having a boiling point of at least 200° C. at normal pressure (atmospheric pressure) is preferable, one having a boiling point of at least 250° C. at normal pressure is more preferable, and one having a boiling point of at least 270° C. at normal pressure is still more preferable in view of improved durability because of volatile resistance.
(Polymer and Oil Gelling Agent)

In the present invention, an electrolyte is also usable via addition of a polymer, an oil gelling agent or the like, but it is preferred that the polymer, the oil gelling agent or the like is not used, in view of ionic conductivity of the electrolyte. In the case of addition of a polymer, usable are compounds described in "Polymer Electrolyte Reviews-1 and 2" (ELSEVIER APPLIED SCIENCE, jointly-edited by J. R. MacCallum and C. A. Vincent), but specifically, polyacrylonitrile and polyvinylidene fluoride are preferably usable.

In the case of addition of an oil gelling agent, usable are compounds described in J. Chem. Soc. Japan, Ind. Chem. Sec., 46, 779 (1943); J. Am. Chem. Soc., 111, 5542 (1989), J. Chem. Soc., Chem. Commun., 1993, 390; Angew. Chem. Int. Ed. Engl., 35, 1949 (1996); Chem. Lett., 885 (1996); and J. Chem. Soc., Chem. Commun., 545 (1997), but the preferable compound is a compound having an amide structure in the molecular structure.

Next, the secondary battery of the present invention will be described.
(Positive Electrode Active Material)

As a positive electrode active material, an inorganic active material, an organic active material and a composite material thereof can be cited, but an inorganic active material, and a composite material composed of an inorganic active material and an organic active material are preferable in view of generation of large energy density.

Examples of the inorganic active material include metal oxides such as $Li_{0.2}MnO_2$, $Li_4Mn_5O_{12}$, $V_2O_5$, $LiCoO_2$, $LiMn_2O_4$, $LiNiO_2$, $LiFePO_4$, $Li_{1/2}Ni_{1/2}Mn_{1/2}O_2$, $Li_{1.2}(Fe_{0.5}Mn_{0.5})_{0.8}O_2$, $Li_{1.2}(Fe_{0.4}Mn_{0.4}Ti_{0.2})_{0.8}O_2$, $Li_{1+x}(Ni_{0.5}Mn_{0.5})_{1-x}O_2$, $LiNi_{0.5}Mn_{1.5}O_4$, $Li_2MnO_3$, $Li_{0.76}Mn_{0.5}Ti_{0.49}O_2$, $LiNi_{0.8}Co_{0.15}Al_{0.05}O_2$ and $Fe_2O_3$; and phosphoric acids, silic acids and boric acids such as $LiFePO_4$, $LiCoPO_4$, $LiMnPO_4$, $Li_2MPO_4$ (M=Fe or Mn), $LiMn_{0.875}Fe_{0.125}PO_4$, $Li_2FeSiO_4$, $Li_{2-x}MSi_{1-x}P_xO_4$ (M=Fe or Mn) and $LiMBO_3$ (M=Fe or Mn). In addition, in these chemical formulae, x is preferably within the range of 0 and 1.

Further, examples of the other inorganic active material include fluorinated compounds such as $FeF_3$, $Li_3FeF_6$, $Li_2TiF_6$ and so forth, metal sulfides such as $Li_2FeS_2$, $TiS_2$, $MoS_2$, $FeS$ and so forth, and lithium-system composite oxides.

Usable examples of the organic active material include a conductive polymer such as polyacetylene, polyaniline, polypyrrole, polythiophene or polyparaphenylene; a sulfuric positive electrode material such as an organic sulfide, organic sulfuric compound DMcT (2,5-dimercapto-1,3,4-thiadiazole), benzoquinone compound PDBM (poly 2,5-dihydroxy-1,4-benzoquinone-3,6-methylene), carbondisulfide or active sulfur; and a organic radical compound.

Further, it is preferred in view of life extension of a battery that inorganic oxide is coated on the surface of a positive electrode active material. As to coating of the inorganic oxide, a method of coating it on the surface of a positive electrode active material is preferable, and as the method, provided is a coating method employing a surface-modifying apparatus such as a Hybridizer, for example.

Examples of such the inorganic oxide include magnesium oxide, silicon oxide, alumina, zirconia and titanium dioxide associated with IIA-VA groups (periodic table); transition metals; oxides of IIIB group and IVB group (periodic table); barium titanate; calcium titanate; lead titanate, γ-$LiAlO_2$ and $LiTiO_3$. Silicon oxide is specifically preferable.
(Negative Electrode Active Material)

The negative electrode is not particularly limited, and one in which a negative electrode active material is attached onto a collector can be utilized. Utilized is one prepared by coating a paste formed from graphite system particle powder, tin system particle powder or the like, together with a binder such as styrenebutadiene rubber, polyvinylidene fluoride or the like on the collector; conducting a drying process; and subsequently press-molding. Also utilized is a silicon-based thin film negative electrode in which a 3-5 µm thick silicon-based thin film is directly formed on a collector via physical evaporation such as a sputtering method, a vacuum evaporation method or the like.

In the case of a lithium metal negative electrode, preferred is one in which a 10-30 µm thick lithium foil is attached onto a copper foil. Those such as a silicon-based thin film negative electrode and a lithium metal negative electrode are preferable from the viewpoint of high capacity.

(Electrode Mixture Agent)

As an electrode mixture agent of the present invention, provided are a lithium salt and those obtained via addition of an aprotic organic solvent or the like, other than a conductive agent, a binder and a filler.

As to a secondary battery fitted with the foregoing conductive agent, any conductive agent may be used as long as it is an electron-conductive material with which no chemical change is produced. Generally, conductive materials such as natural graphite (for example, flake graphite, scale-like graphite, earth graphite and so forth), artificial graphite, carbon black, acetylene black, ketjen black, carbon fiber, metal powder made of copper, nickel, aluminum or silver (disclosed in Japanese Patent O.P.I. Publication No. 63-148,554), metal fiber, a polyphenylene derivative (disclosed in Japanese Patent O.P.I. Publication No. 59-20,971) and so forth can be contained singly or as an admixture of these thereof.

Of these, graphite and acetylene black used in combination are specifically preferable. An addition amount of the foregoing conductive agent is preferably 1-50% by weight, and more preferably 2-30% by weight. In the case of carbon or graphite, it is preferably 2-15% by weight.

In the present invention, a binder is employed in order to retain the electrode mixture agent. As such the electrode mixture agent, provided are polysaccharide, a thermoplastic resin, and a polymer exhibiting rubber elasticity. Of these, preferable are, for example, a water-soluble polymer such as polysaccharide, carboxymethyl cellulose, cellulose, diacetyl cellulose, methyl cellulose, hydroxyethyl cellulose, hydroxypropyl cellulose, sodium alginate, polyacrylic acid, sodium polyacrylate, polyvinylphenol, polyvinylmethyl ether, polyvinyl alcohol, polyvinyl pyrrolidone, polyacrylonitrile, polyacrylamide, polyhydroxy(meth)acrylate or a styrene-maleic acid copolymer; a (meth)acrylic acid ester copolymer containing (meth)acrylic acid ester such as polyvinyl chloride, polytetrafluoroethylene, vinylidene polyfluoride, a tetrafluoroethylene-hexafluoropropylene copolymer, a vinylidene fluoride-tetrafluoroethylene-hexafluoropropylene copolymer, polyethylene, polypropylene, an ethylene-propylene-diene terpolymer (EPDM), sulfonated EPDM, a polyvinylacetal resin, methyl methacrylate or 2-ethylhexylacrylate; a polyvinylester copolymer containing vinyl ester such as a (meth)acrylic acid ester-acrylonitrile copolymer or vinyl acetate; and an emulsion (latex) or a suspension such as a styrene-butadiene copolymer, an acrylonitrile-butadiene copolymer, polybutadiene, neoprene rubber, fluorine-based rubber, polyethylene oxide, a polyester polyurethane resin, a polyether polyurethane resin, a polycarbonate polyurethane resin, a polyester resin, a phenol resin or an epoxy resin. Polyacrylic acid ester-based latex, carboxymethyl cellulose, polytetrafluoroethylene and vinylidene polyfluoride are more preferable.

The foregoing binders may be used singly or in combination with at least two kinds. In the case of a small addition amount of the binder, retention force and coagulation force of the electrode mixture agent become weak. In the case of an excessive amount of the binder, capacity per unit volume or unit weight of the electrode is reduced because of increase of the electrode volume. For such the reason, an addition amount of the binder is preferably 1-30% by weight, and more preferably 2-10% by weight.

As to the foregoing filler, any filler is usable as long as it is a fibrous material employed for a secondary battery of the present invention, which produces no chemical change. Generally usable are fibers made of an olefin based polymer such as polypropylene, polyethylene or the like; glass; or carbon. An addition amount of the filler is not specifically limited, but an addition amount of 0-30% by weight is preferable.

(Collector)

In the secondary battery of the present invention, electron conductors producing no chemical change are employed as positive and negative electrode collectors. The positive electrode collector is preferably made of aluminum, an aluminum alloy, stainless steel, nickel or titanium, and also preferable is another one in which carbon, nickel, titanium or silver is treated on the surface of aluminum or stainless steel. Of these, the positive electrode collector is more preferably made of aluminum or an aluminum alloy. The negative electrode collector is preferably made of copper, a copper alloy, stainless steel, nickel or titanium, and more preferably made of copper or a copper alloy.

As the foregoing collector, conventionally used is one in the form of a film sheet, but a porous body, a foam, a fibrous group mold and so forth are also usable. The thickness of the foregoing collector is not specifically limited, but the foregoing collector preferably has a thickness of 1-500 µm. Further, the surface of a collector is preferably roughened via a surface treatment.

(Preparation of Secondary Battery)

Herein, preparation of a nonaqueous secondary battery in the present invention will be described. The shape of the secondary battery in the present invention can be designed to be any of sheet shape, prismatic shape, cylinder shape and so forth. The electrode mixture agent for a positive electrode active material and a negative electrode active material which is coated on a collector is mainly used via drying and compression.

Preferable examples of coating methods of the foregoing electrode mixture agent include a reverse roll method, a direct roll method, a blade method, a knife method, an extrusion method, a curtain method, a gravure method, a dipping method and a squeeze method. Of these, a blade method, knife method and an extrusion method are preferable.

Further, coating is preferably carried out at a speed of 0.1-100 m/min. In this case, an excellent surface condition of the coating layer can be obtained by selecting the above-described coating method in consideration of matter properties of the electrode mixture agent and dryness. Coating may be conducted on one surface after the other surface, and may also be conducted on the both surfaces at the same time. Further, the foregoing coating may also be continuous coating, intermittent coating or stripe coating.

The thickness, length and width of the coating layer are determined depending on shape and size of the battery, but a coating layer provided on one surface preferably has a thickness of 1-2000 µm in a compressed state after drying.

As a method of drying and dehydrating the foregoing electrode sheet coating material, hot air, vacuum, infrared rays, far-infrared rays, electron beams and low moisture air can be used singly or in combination. A drying temperature of 80-350° C. is preferable, and a drying temperature of 100-250° C. is more preferable. A water content of 2000 ppm or less, based on the entire battery, is preferable, but a water content of 500 ppm or less, based on a positive electrode mixture agent, a negative electrode mixture agent or an electrolyte is preferable.

As a method of pressing a sheet, a conventionally available method is usable, but specifically, a calendar pressing method is preferably usable. The pressing pressure is not specifically limited, but a pressing pressure of 0.2-3 t/cm$^2$ is preferable. In the foregoing calendar pressing method, a press speed of 0.1-50 m/min is preferable, and a press temperature of room temperature to 200° C. is preferable. A ratio of a negative electrode width to a positive electrode width is preferably 0.9-1.1, and more preferably 0.95-1.0. A content ratio of a negative electrode to a positive electrode depends on kinds of compounds, and formulation of an electrode mixture agent.

The form of a secondary battery of the present invention is not specifically limited, but the secondary battery can be enclosed in each of various cells in the form of a coin, a sheet, a cylinder or the like.

Application of a secondary battery of the present invention is not specifically limited, but examples of electronic devices thereof include a notebook PC, a stylus-operated PC, a mobile PC, an electronic book player, a cellular phone, a cordless telephone handset, a pager, a handy terminal, a handy fax machine, a handy copier, a handy printer, a headphone stereo, a video movie player, a liquid crystal TV, a handy cleaner, a portable CD, a mini disc, an electronic shaver, a transceiver, an electronic diary, an electronic calculator, a memory card, a handy tape recorder, a radio, a backup power supply, a memory card and so forth.

Examples of others thereof for consumer use include an automobile, an electronic vehicle, a motor, fluorescent light fittings, a toy, a game machine, a load conditioner, a watch, a stroboscope, a camera, a medical device (a pace maker, a hearing aid, a shoulder massage tool or the like) and so forth. Further, the secondary battery can be applied for military and apace products, and can also be applied in combination with a solar battery.

EXAMPLE

Next, the present invention will now be described referring to examples, but the present invention is not limited thereto. Incidentally, "parts" and "%" in the examples represent "parts by weight" and "% by weight", respectively unless otherwise specifically mentioned.

Example 1

Preparation of Mesoporous Silica Particle

In 100 ml of deionized water, dissolved was 3.645 g of cetyltrimethylammonium bromide, and 4.41 ml of 1 M hydrochloric acid was charged in the resulting solution. Next, a solution in which 20 g of tetraethoxysilane (TEOS) was dissolved in 44 ml of deionized water was added into this solution while stirring, spending 5 minutes. Thereafter, the resulting exposed to a 100 W high pressure mercury lamp at a light quantity of approximately $2.5 \times 10^{16}$/sec/cm$^2$ was stirred for 24 hours.

The resulting precipitate was filtrated, and subsequently washed with deionized water, followed by drying under the reduced pressure at 100° C. for 12 hours to obtain 3.2 g of a composite. The resulting composite was burned in air at 500° C. for 8 hours, and subsequently subjected to a surface treatment for 2 hours via addition of 0.5 g of hexamethyldisilazane after lowering the temperature to 200° C. to obtain 2 g of mesoporous silica particle No. 6 having mesopores.

Mesoporous silica particle No. 6 had a fine pore diameter of 15 nm, a specific surface area of 800 m$^2$/g, and an average particle diameter of 42 µm.

In addition, the fine pore diameter and the specific surface area were measured employing an automatic specific surface area/poresize distribution measuring apparatus BELLSORP-miniII, manufactured by the BELL Japan, Inc. The average particle diameter was obtained by determining the mean value obtained via a sphere conversion particle diameter of each particle after observing at least 200 particles with a scanning electron microscope.

Mesoporous silica particle Nos. 1-5 and No. 7 having different fine pore diameters, different specific surface areas, and different average particle diameters were prepared similarly to preparation of mesoporous silica particle No. 6, except that the amount of cetyltrimethylammonium bromide and the amount of TEOS were changed.

The fine pore diameter, the specific surface area and the average particle diameter of each mesoporous silica particle are shown in the following Table 1. In addition, organosilica sol MEK-ST in Table 1 is a nonporous particle having a specific surface area of 200 m$^2$/g and a particle diameter of 10 nm.

[Preparation of Electrolyte]
(Preparation of Electrolytes 1-11)

The above-prepared mesoporous silica particles having been used were charged in a drying machine in advance to reduce pressure to 0 torr, and dried at 100° C. for 4 hours. Next, 3.2 g of an ionic liquid and 0.29 g of LiN(CF$_3$SO$_2$)$_2$ were mixed in a dry box employing a mortar. Further, 0.96 g of the mesoporous silica particles to be mixed were gradually added in the mortar to prepare electrolytes 1-11.

[Preparation of Secondary Battery]
(Preparation of Positive Electrode Sheet)

After adding 43 parts by weight of LiCoO$_2$ as a positive electrode active material, 2 parts by weight of scale-like graphite, 2 parts by weight of acetylene black, and further 3 parts by weight of polyacrylonitrile, the resulting was kneaded with 100 parts by weight of acrylonitrile as a medium to obtain a slurry. The slurry was coated on a 20 µm thick aluminum foil employing an extrusion coater, followed by drying and compression-molded with a calendar pressing machine, and subsequently, a lead plate made of aluminum was welded at the end of the resulting to prepare a positive electrode sheet having a thickness of 95 µm, a width of 54 mm and a length of 49 mm. Thereafter, it was dehydrated in dry air at dew point −40° C., and dried at 230° C. for 30 minutes.

(Preparation of Cell in the Form of Sheet)

The gel exhibiting low viscosity lowered by adding acetonitrile in each of the above-described electrolytes 1-11 was coated on a positive electrode sheet having a width of 54 mm and a length of 49 mm, having been subjected to dehydration and drying in a dry box, followed by drying of acetonitrile at 80° C. to form a layer having a thickness of 40 µm.

Further, negative electrode sheets each having a width of 55 mm and a length of 50 mm, in which the above-described lead plate was welded (lithium attached onto a copper foil having a lithium film thickness of 30 µm and a copper foil thickness of 20 µm), were multilayered, and heated under reduced pressure at 80° C. for 3 hours. Thereafter, an enclosure material formed from a laminate film of polyethylene (50 µm in thickness) and polyethylene terephthalate (50 µm in thickness) was used, and four edges were fused with heat under vacuum for sealing to prepare a cell in the form of a sheet.

[Measurement of Dynamic Elastic Modulus of Electrolyte]

The dynamic elastic modulus was measured in CD mode (deformation control mode) with r=0.002 and f=0.01 Hz, employing a HAAKE rheometer RS150.

[Evaluation of Durability]

Each obtained secondary battery was continuously charged with a constant current by 4.2 V until reaching 4.2 V with a constant current of 0.2 C. The total duration from starting of constant current charging to termination of constant voltage was set to 7 hours. Each secondary battery after charging was initialized by discharging at 0.2 C until dropping from 4.2 V to 3.0 V. Further, charging with a constant current of 0.5 C and discharging with a constant current of 1 C were continuously conducted in an oven at 60° C. The number of charging-discharging cycles taken until the capacity falls 20% from the first charging capacity after initialization is designated as an indicator of durability.

In addition, RX200 in Table 1 represents silica particles produced by Nippon Aerosil Co., Ltd., that is, nonporous particles each having no mesopore.

Further, each of a and b in Table 1 represent an ionic liquid.

a: N-methyl-N-propylpiperidinium.bis (fluoromethylsulfonyl) imide b: N-methyl-N-propylpiperidinium.bis(tri fluoromethylsulfonyl) imide

TABLE 1

| | Ionic liquid | Porous particle | Specific surface area (m2/g) | Average particle diameter | Dynamic elastic modulus (Pa) | Durability (Cycle number) | Remarks |
|---|---|---|---|---|---|---|---|
| Electrolyte 1 | a | RX200(Nonporous particle) | 200 | 10 nm | 83200 | 4 | Comp. |
| Electrolyte 2 | b | RX200(Nonporous particle) | 200 | 10 nm | 79900 | 6 | Comp. |
| Electrolyte 3 | a | No. 1(Fine pore diameter: 20 nm) | 200 | 16 μm | 120000 | 90 | Inv. |
| Electrolyte 4 | a | No. 2(Fine pore diameter: 9 nm) | 400 | 12 μm | 270000 | 100 | Inv. |
| Electrolyte 5 | a | No. 3(Fine pore diameter: 7 nm) | 600 | 3 μm | 460000 | 110 | Inv. |
| Electrolyte 6 | a | No. 4(Fine pore diameter: 8 nm) | 600 | 22 μm | 780000 | 122 | Inv. |
| Electrolyte 7 | b | No. 4 | 600 | 22 μm | 790000 | 123 | Inv. |
| Electrolyte 8 | a | No. 4 + Organosilica sol MEK-ST (no fine pore) | 600 | 22 μm | 9000000 | 155 | Inv. |
| Electrolyte 9 | a | No. 5(Fine pore diameter: 13 nm) | 600 | 57 μm | 960000 | 130 | Inv. |
| Electrolyte 10 | a | No. 6(Fine pore diameter: 15 nm) | 800 | 42 μm | 930000 | 125 | Inv. |
| Electrolyte 11 | a | No. 7(Fine pore diameter: 2.5 nm) | 1100 | 7 μm | 1000000 | 100 | Inv. |

Comp.: Comparative example, Inv.: Present invention

As is clear from Table 1, it is to be understood that a secondary battery fitted with an electrolyte of the present invention exhibits excellent durability.

Effect Of The Invention

It becomes possible to provide a secondary battery exhibiting excellent durability via application of an electrolyte of the present invention.

What is claimed is:

1. An electrolyte consisting of porous inorganic particles, an ionic liquid and a supporting electrolyte salt,
   wherein the electrolyte has a dynamic elastic modulus of at least $10^5$ Pa, wherein the supporting electrolyte salt comprises at least one selected from the group consisting of $LiCF_3SO_3$, $LiPF_6$, $LiClO_4$, $LiI$, $LiBF_4$, $LiCF_3CO_2$, $LiSCN$, $LiN(CF_3SO_2)_2$, $NaI$, $NaCF_3SO_3$, $NaClO_4$, $NaBF_4$, $NaAsF_6$, $KCF_3SO_3$, $KSCN$, $KPF_6$, $KClO_4$ and $KAsF_6$.

2. The electrolyte of claim 1,
   wherein the porous particles each have a specific surface area of 500- 1000m$^2$/g.

3. The electrolyte of claim 2,
   wherein the porous particles have an average particle diameter of 5- 50μm.

4. The electrolyte of claim 1,
   wherein the dynamic elastic modulus is $10^8$ Pa or less.

5. The electrolyte of claim 1,
   wherein the supporting electrolyte salt contained in the electrolyte preferably has an content of 5- 40% by weight.

6. The electrolyte of claim 1,
   wherein the porous particles each comprise a mesoporous inorganic particle.

7. The electrolyte of claim 6,
   wherein the mesoporous inorganic particle has a specific surface area of 300- 1000m$^2$/g.

8. A secondary battery comprising the electrolyte of claim 1 between a positive electrode and a negative electrode.

9. The secondary battery of claim 8, being a lithium secondary battery.

* * * * *